United States Patent [19]

Johnson et al.

[11] Patent Number: 5,664,063
[45] Date of Patent: Sep. 2, 1997

[54] AUTOMATIC USER NOTIFICATION OF CERTAIN MEETING ATTRIBUTES OF A POSTED CALENDAR EVENT

[75] Inventors: William J. Johnson, Flower Mound; Owen Wayne Weber, Coppell, both of Tex.

[73] Assignee: International Business Machines Corporation, Armonk, N.Y.

[21] Appl. No.: 347,626

[22] Filed: Dec. 1, 1994

[51] Int. Cl.[6] .............................. G06F 1/14; G06F 15/02
[52] U.S. Cl. ...................... 395/101; 395/50; 395/603; 364/DIG. 1; 364/DIG. 2; 705/1
[58] Field of Search .................... 395/161, 800, 395/50, 2.69, 75, 2.79, 66, 10, 11, 427, 497; 382/186; 364/436, DIG. 1, 401, DIG. 2, 419.19, 400, 410, 705.08, 401 R, 413.2; 400/712; 379/96

[56] References Cited

U.S. PATENT DOCUMENTS

| | | | |
|---|---|---|---|
| 3,999,050 | 12/1976 | Pitroda | 364/705.08 |
| 4,327,251 | 4/1982 | Fomenko et al. | 395/2.79 |
| 4,573,134 | 2/1986 | Ikemoto | 364/705.08 |
| 4,582,441 | 4/1986 | Carter et al. | 400/712 |
| 4,653,100 | 3/1987 | Barnett et al. | 38/52 |
| 5,001,745 | 3/1991 | Pollock | 379/96 |
| 5,247,438 | 9/1993 | Subas et al. | 364/400 |
| 5,283,731 | 2/1994 | Lalonde et al. | 364/401 |
| 5,311,423 | 5/1994 | Clark | 364/401 |
| 5,329,447 | 7/1994 | Leedom, Jr. | 364/419.19 |
| 5,359,510 | 10/1994 | Sabaliauskas | 364/410 |

*Primary Examiner*—Daniel H. Pan
*Attorney, Agent, or Firm*—Edward Duffield; Andrew J. Dillon

[57] ABSTRACT

A method of automatically informing a calendar user of certain meeting attributes when a meeting notice is posted to a calendar program. The user posts the meeting notice on the user's calendar. The posting routine of the calendar program reads the meeting notice and compares it with the user's posting profile which contains a plurality of search predicates. A search predicate includes one or more attributes of a calendar event notice, conjunctive specifications for the attributes, and specified criteria for each of the attributes. If certain attributes of the meeting notice match any number of the search predicates of the posting profile, the user's individual computer outputs an audio message associated with each search predicate found in the notice.

21 Claims, 2 Drawing Sheets

5,664,063

AUTOMATIC USER NOTIFICATION OF CERTAIN MEETING ATTRIBUTES OF A POSTED CALENDAR EVENT

BACKGROUND OF THE INVENTION

1. Technical Field

The present invention relates in general to data processing system based meeting scheduling systems, and in particular to a method and system for producing user-defined responses when selected search strings are present in a posted calendar event.

2. Description of the Related Art

Scheduler or calendar programs allow a user to maintain an electronic calendar of upcoming events. The posting feature of a calendar program allows a user to post calendar events directly from electronic documents such as E-mail that describe those events. For example, a meeting notice sent to the user's terminal as an electronic letter can be posted directly in the calendar so that the meeting will be scheduled in the user's calendar on the correct date and time.

When posting calendar events, users must read the meeting notices before posting in order to obtain high-level information about the meeting or event. Sometimes the desired information is buried in the text of the meeting notice, causing the user to spend a considerable amount of time reading the notice just to discern the general topic or objective of the meeting. A method is needed to enable the user to simply and quickly determine user-defined generalities of the meeting as part of the posting process.

SUMMARY OF THE INVENTION

According to the present invention, a method and system of user-defined response to the posting of a calendar event is provided. The present invention is utilized in a data processing system having a database of scheduled calendar events. A posting profile containing a plurality of search predicates is established, wherein a search predicate includes one or more attributes of a calendar event notice and conjunctive specifications for the attributes. A separate posting response is associated with each search predicate. When a calendar event is posted to the database, the calendar event notice announcing the calendar event is searched for each of the search predicates contained in the posting profile. Thereafter, the posting response for each search predicate satisfied by the search of the calendar event notice is performed.

In a preferred embodiment, specific criteria for each attribute is established in the posting profile. The calendar event notice is searched to satisfy the search predicate, which, in this embodiment, contains the conjunctive specifications and attributes having the specified criteria. Also, in a preferred embodiment, a posting response comprises the playing of an audio message.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction the accompanying drawings, wherein:

DETAILED DESCRIPTION OF THE PREFERRED EMBODIMENT

Figure 1:
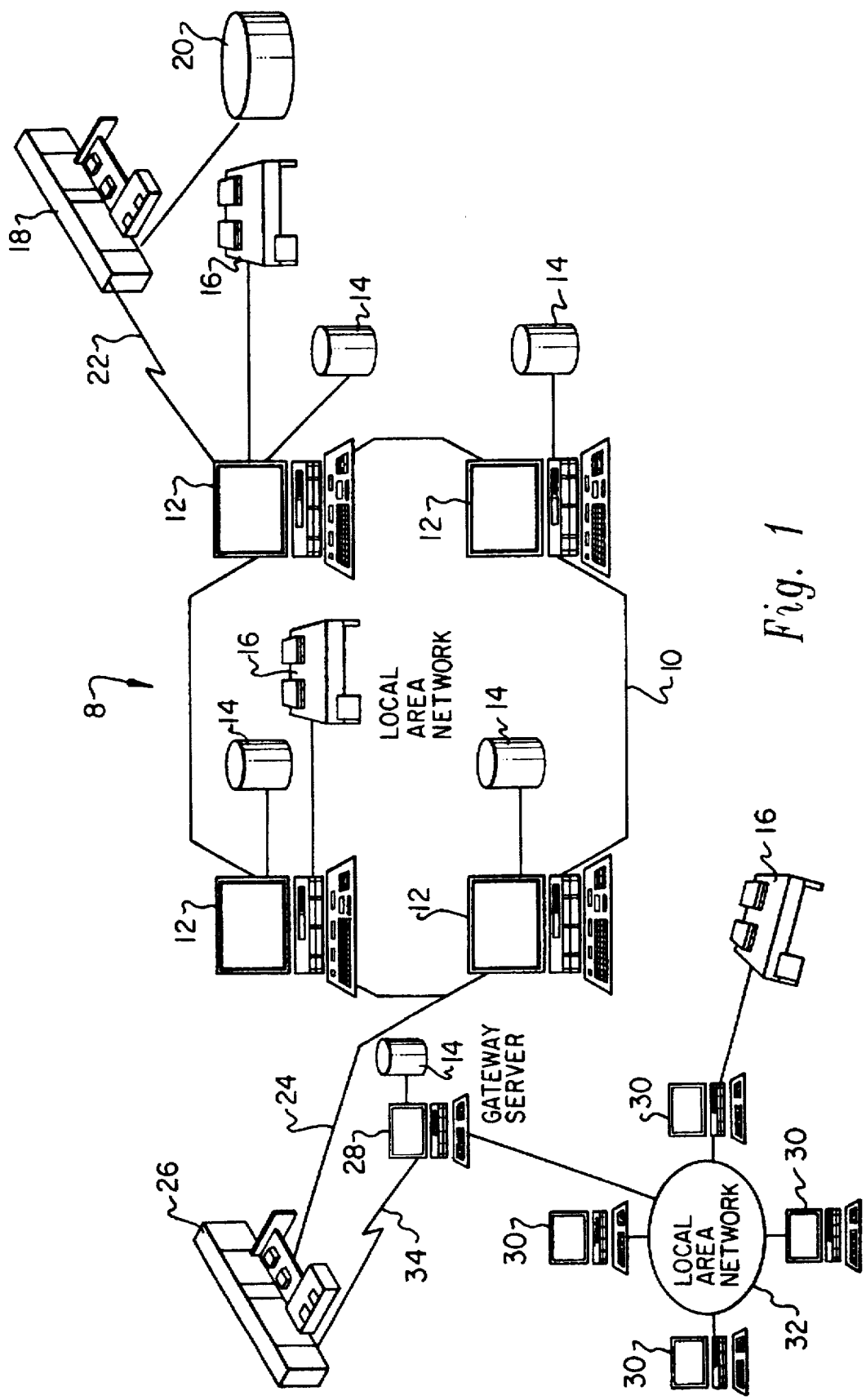
FIG. 1 there is depicted a pictorial representation of a distributed data processing system which may be utilized to implement the method and system of the present invention.

With reference now to the figures and in particular with reference to FIG. 1, there is depicted a pictorial representation of a distributed data processing system which may be utilized to implement the method and system of the present invention. As may be seen, distributed data processing system 8 may include a plurality of networks, such as Local Area Networks (LAN) 10 and 32, each of which preferably includes a plurality of individual computers 12 and 30, respectively. The individual computers 12 and 30 are equipped with video displays and audio speakers. Of course, those skilled in the art will appreciate that a plurality of Intelligent Work Stations (IWS) coupled to a host processor may be utilized to implement each such network.

As is common in such data processing systems, each individual computer may be coupled to a storage device 14 and/or a printer/output device 16. One or more storage devices 14 may be utilized, in accordance with the method and system of the present invention, to store a calendar database of scheduled calendar events for one or more users within data processing system 8. Further, one or more such storage devices 14 may be utilized to store a data processing program which may be utilized to implement the method and system of the present invention.

Still referring to FIG. 1, it may be seen that distributed data processing system 8 may also include multiple mainframe computers, such as mainframe computer 18, which may be preferably coupled to Local Area Network (LAN) 10 by means of communication line 22. Mainframe computer 18 may be coupled to a storage device 20 which may serve as remote storage for a Local Area Network (LAN) 10 and may be coupled via communications controller 26 and communication line 34 through a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a calendar database of scheduled calendar events for a plurality of prospective meeting attendees, meeting sites, and/or elements of equipment may be stored within storage device 20 within data processing system 8 and controlled by mainframe computer 18, or a calendar database for each individual calendar user can be maintained by each individual computer 12, 30 through which each user accesses the calendar program. A calendar database may be local or remote to a user.

In a typical scenario of the use of the present invention, a user of individual computers 12 or 30 in distributed data processing system 8 opens electronic mail addressed to the user from another user on the network. When the electronic mail includes a meeting notice, the user will post the meeting notice on the user's calendar. The posting feature of a calendar program is well-known by those skilled in the art. For example, two calendar programs, *Office Vision/Virtual Machine* (OV/VM®) by International Business Machines, Corp. (IBM), and *Time And Place/2®* by IBM, allow users to receive meeting notices in their E-mail in-basket. After opening the mail item, the user can press a function key to post the event to his OV/VM calendar. An OV/VM user may also directly update one or more other users' calendars. This may also be another form of posting.

According to the present invention, the calendar user is automatically informed of certain meeting attributes when a meeting notice is posted to the calendar program. The posting routine of the calendar program would read the meeting notice and compare it with the user's posting profile. If certain attributes of the meeting notice match any number of the search predicates of the posting profile, the user's individual computer performs the configured operation, for example, outputs an audio message associated with each search predicate found in the notice.

According to the present invention, a user must first configure a posting profile to which the calendar application will access when posting a notice to the calendar. The user selects a posting profile configuration option in the calendar program. The user would then enter one or more search predicates and a posting response for that search predicate in a posting profile file. The format for a posting profile entry would be:

search predicate [attribute=criteria, etc]; posting response

An attribute would be an element of a meeting notice which is to be compared. For example, an attribute could be the subject of the meeting notice, the requester of the meeting, or the date and time of the meeting. A meeting notice is divided into various fields containing the attributes. The posting program would be preprogrammed to know which fields are to be searched for a particular attribute. The search predicate may also set the attribute equal to specific criteria. In other words, the search is made for not just the attribute (ex. any requester), but for a particular type of attribute (ex. a requester named R. J. Smith). Criteria of the posting profile attributes is the particular data to be searched for in an attribute's field. For example, the criteria of a "requester" attribute could be "R. J. Smith", i.e. the search predicate is a requester named R. J. Smith.

The posting response is the audio message which is played to the user at the time of posting when a posted meeting notice meets the criteria specified for this attribute. For example, the posting response for a search predicate of "Requester=R. J. Smith" could be "Bob's meeting". A separate posting response is associated with each search predicate in the posting profile. For example, consider the following posting profile:

| Search Predicate | Posting Response |
| --- | --- |
| Subject = BRAZOS | "This is a BRAZOS meeting." |
| Requestor = R.J. Smith | "Bob's meeting" |
| Date/Time within 1 day | "This meeting is tomorrow" |
| Meeting day = Monday AND time < 12:00 | File: MONDAY.AM_BLUES/*song*/ |
| RSVP | "RSVP is requested" |

Thus, for this first example of a posting profile, whenever "Bob" posts a meeting notice from "R. J. Smith", the system will annotate the message "Bob's meeting" to the user. Further, whenever the user posts a meeting notice for a Monday morning meeting, the user hears the song stored in the file MONDAY.AM_BLUES at the time of posting. Also, if the meeting notice contains an RSVP requesting the user to acknowledge that he will attend the meeting, the system will announce that an "RSVP is requested." RSVP is an example of a search predicate containing an attribute but no criteria for the attribute.

Therefore, the user configures a posting profile in which the user associates certain search predicates with certain audio messages or tones. The user defines each search predicate as a function of meeting attributes, such as subject, requester, duration, etc. Then, when a calendar event notice is posted to the database, the program will search the corresponding calendar event notice announcing the calendar event for each of the search predicates contained in the posting profile. If a search predicate in the posting profile is satisfied such that the correct combination of attributes are found in the search of the calendar event notice, the posting response will be performed, such as playing the associated audio segment. If more than one search predicate is satisfied, the posting response for each satisfied predicate is performed in the order listed in the posting profile. In an alternative embodiment, in the event that more than one search predicate is satisfied, only the posting response for the first satisfied predicate is performed.

In an alternative embodiment, the search predicates may be more complicated, having a plurality of attributes and/or a plurality of criteria having conjunctive specifications. Such conjunctive specifications would be logical operations such as OR, AND, XOR, etc. An example of a posting profile with complex search predicates would be as follows:

SUBJECT=(("Bill" OR "Johnson") AND "patent") XOR ("1994"); "Take Johnson file to the meeting"

DATE/TIME=(>94/11/07;00:00:00 AND <94/11/08;11:45:00) OR (>94/10/31;00:00:00 AND <94/10/31;23:59:59); "end of the month"

REQUESTER="Craig"; "Craig's meeting"

RECIPIENT="Bill"; "This notice is to Bill"

BODY="patent #5,300,934"; "Patent notice"

[SUBJECT="Patent"] AND [REQUESTER="Bob"]; "Patent meeting with Bob"

The search predicate in the first line of the posting profile above is for a single attribute having complex criteria. The search predicate in the last line of the posting profile above is a complex search predicate having two attributes, subject and requester. The syntax embodiment demonstrated utilizes parentheses for conjunctions within an attribute, and brackets for conjunctions of attribute expressions.

In another feature of the present invention, the user may also specify an audio segment to be played whenever an associated calendar reminder is triggered. A calendar reminder is a feature of a calendar program that is well-known by those skilled in the art. When the system executes a calendar reminder, which is a video message reminding the user of the pending meeting, it will search the reminder using the posting profile of the user. If a search predicate in the posting profile is matched, its associated posting response would be performed. Audio segments can be configured as binary waveform file references, strings bound for conversion, or other suitable means.

Figure 2:
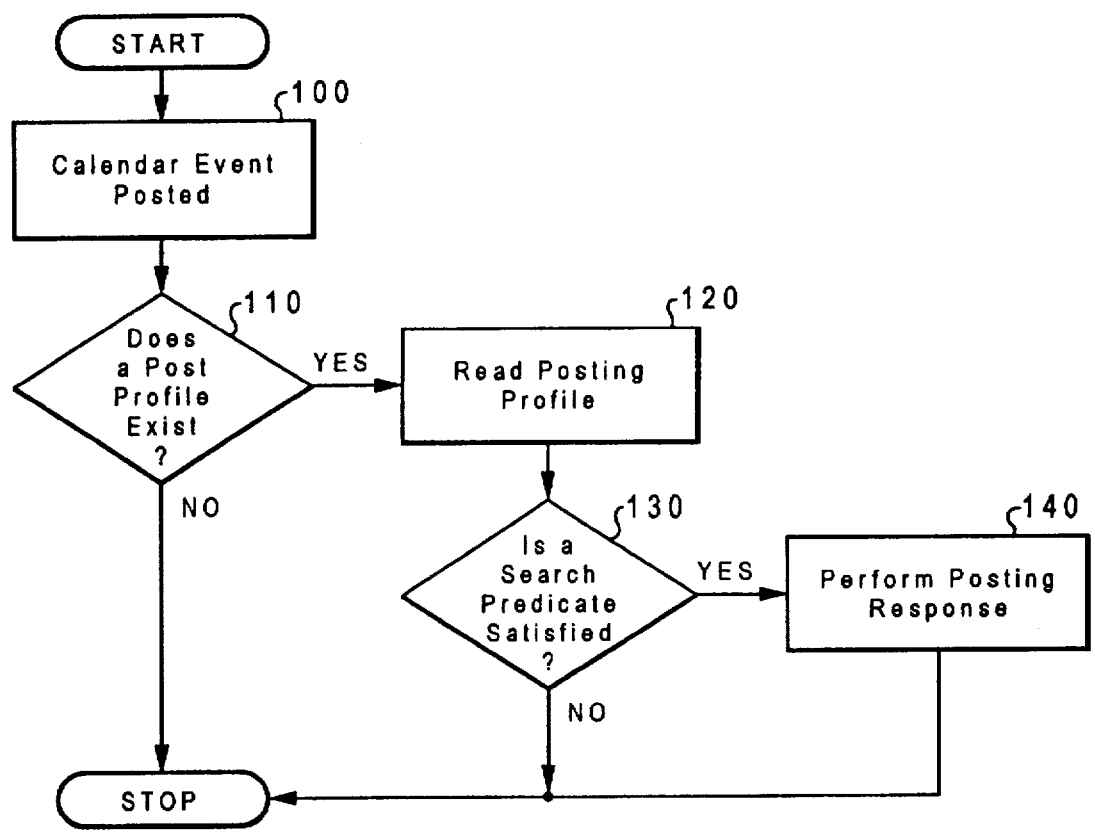
FIG. 2 is a flow diagram of the method of calendar event posting in accordance with a preferred embodiment of the present invention.

A preferred embodiment of the present invention can best be understood with reference to the flowchart in FIG. 2. In FIG. 2 there is depicted a flowchart of a preferred embodiment of the method of calendar event posting of the present invention. At step 100, the user posts a calendar event such as a meeting notice to the calendar program. At step 110, a determination is made whether a posting profile exists for this user. If not, the process stops. If a posting profile has been configured by the user, the posting profile is read at step 120. At step 130, a comparison is made between the calendar event notice content and the search predicates contained in the posting profile to determine if there is a match of the attributes such that one or more search predicates are satisfied. Attributes of a meeting notice are located in particular fields of a meeting notice. The appropriate fields of the meeting notice are searched for the attributes indicated in the posting profile. It is determined if the attributes of the meeting notice match the criteria specified for those attributes in the posting profile. If the specified criteria is found, it is then determined whether those attributes meet the conjunctive specifications of the posting profile. If matching attributes in the meeting notice contain the specified criteria, and those attributes satisfy the conjunctive specification, that search predicate is satisfied. If there is no match, the process ends and no posting response is performed. If a match does occur, the posting response associated with each search predicate satisfied by the calendar event notice is performed at step 140. Thereafter, the process stops.

Although calendar events are described as meetings in the preferred embodiment, it will be appreciated by those skilled in the art that a calendar application may be used to schedule calendar events other than meetings. For example, a calendar event may be a project deadline, a telephone conference, or a television/radio program which the user wants to note in his calendar. In addition, although in a preferred embodiment the calendar event notice was searched by fields, the search of the calendar notice can be performed by searching arbitrary text anywhere in the notice.

Although a posting response in the preferred embodiment is an audio message, it will be appreciated by those skilled in the art that the posting response may be a different response, such as, for example, the display of a video message. As will be appreciated by those skilled in the art, the audio components or segments may be prerecorded, annotated, or manufactured with various methods.

In summary, the present invention automatically informs the calendar user of certain meeting attributes when a meeting notice is posted to the calendar program. The user posts the meeting notice on the user's calendar. The posting routine of the calendar program reads the meeting notice and compares it with the user's posting profile. The posting profile contains a plurality of search predicates for calendar event notices. A search predicate includes one or more attributes of a calendar event notice and conjunctive specifications for the attributes. In addition, the posting profile further specifies criteria for each of the attributes. If certain attributes of the meeting notice match any number of the search predicates of the posting profile, the user's individual computer outputs an audio message associated with each search predicate found in the notice.

As can be seen, the present invention allows a user to discover important information about a calendar event notice without requiring the user to read each meeting notice for general information while posting the notice. Such a feature enhances efficiency while providing more user-friendly interface with the calendar program.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for automatic user notification of certain attributes of a posted calendar event, the data processing system having a database of scheduled calendar events, the method comprising the steps of:

establishing a posting profile containing a plurality of search predicates for calendar event notices, wherein a search predicate includes an attribute of a calendar event notice;

associating a separate posting response with at least one search predicate;

when a calendar event is posted to the database, searching a corresponding calendar event notice for each of the search predicates contained in the posting profile; and automatically performing the posting response associated with at least one search predicate found in the calendar event notice.

2. The method according to claim 1, wherein the search predicate comprises two or more attributes.

3. The method according to claim 2, wherein a search predicate includes conjunctive specifications for the attributes.

4. The method of claim 3, wherein the step of establishing a posting profile further comprises specifying criteria for one or more of the attributes, and further wherein the step of searching the calendar event notice comprises searching for each search predicate such that only the attributes meeting the conjunctive specifications and the specified criteria match the search predicate.

5. The method of claim 1, wherein the step of establishing a posting profile further comprises specifying criteria for an attribute and, wherein the step of searching comprises searching for each search predicate such that only an attribute meeting the specified criteria match the search predicate.

6. The method of claim 1, wherein one or more attributes are associated with a particular field in the calendar event notice, and the step of searching comprises searching for an attribute of the search predicate in any associated field.

7. The method of claim 1, wherein at least one posting response comprises playing an audio message.

8. The method of claim 1, wherein at least one posting response comprises displaying a written message.

9. The method of claim 1, wherein at least one posting response comprising displaying a graphic image.

10. The method of claim 1, wherein, when a calendar reminder is performed, the posting response for each search predicate found in the calendar event notice is performed.

11. The method of claim 1, wherein the calendar event notice is a meeting notice.

12. The method of claim 1, wherein each search predicate is associated with a different posting response.

13. A data processing system comprising:

a database of scheduled calendar events;

means for establishing a posting profile containing a plurality of search predicates for calendar event notices, wherein a search predicate includes one or more attributes of a calendar event notice and conjunctive specifications for the attributes;

means for associating a separate posting response with each search predicate;

means for searching a calendar event notice announcing the calendar event for each of the search predicates contained in the posting profile when a calendar event is posted to the database; and means for automatically performing the posting response associated with each search predicate found in the calendar event notice.

14. The data processing system of claim 13, further comprising means for specifying criteria for one or more of the attributes, and wherein the means for searching searches for each search predicate such that only the attributes meeting the conjunctive specifications and the specified criteria match the search predicate.

15. The data processing system of claim 13, wherein one or more attributes are associated with a particular field in the calendar event notice, and the means for searching searches for an attribute of the search predicate in any associated field.

16. The data processing system of claim 13, wherein at least one posting response comprises playing an audio message.

17. The data processing system of claim 13, wherein at least one posting response comprises displaying a written message.

18. The data processing system of claim 13, wherein at least one posting response comprises displaying a graphic image.

19. The data processing system of claim 13, further comprising means for, when a calendar reminder is performed, performing the posting response for each search predicate found in the calendar event notice.

20. The data processing system of claim 13, wherein the calendar event notice is a meeting notice.

21. The data processing system of claim 13, wherein each search predicate is associated with a different posting response.

* * * * *